(12) United States Patent  
Guercioni

(10) Patent No.: US 7,805,825 B2  
(45) Date of Patent: Oct. 5, 2010

(54) METHOD FOR FORMING MOTOR WINDING CONDUCTORS

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 194 days.

(21) Appl. No.: 11/728,104

(22) Filed: Mar. 22, 2007

(65) Prior Publication Data

US 2009/0178270 A1    Jul. 16, 2009

(51) Int. Cl.  
*H02K 15/04* (2006.01)

(52) U.S. Cl. .......................................... 29/596; 310/201

(58) Field of Classification Search .................. 29/596, 29/598, 606, 868, 869, 871; 310/201  
See application file for complete search history.

(56) References Cited

U.S. PATENT DOCUMENTS

| | | | |
|---|---|---|---|
| 1,332,154 A | 2/1920 | Apple | |
| 2,387,885 A | 10/1945 | Davis | |
| 2,400,739 A | 5/1946 | Burge | |
| 2,476,743 A | 7/1949 | Leece | |
| 2,476,745 A | 7/1949 | Leece | |
| 4,437,230 A | 3/1984 | Greutmann | |
| 5,192,087 A | 3/1993 | Kawashima et al. | |
| 5,266,858 A * | 11/1993 | Ohmi et al. | 310/208 |
| 5,522,125 A | 6/1996 | Bradtmueller et al. | |
| 6,249,956 B1 | 6/2001 | Maeda et al. | |
| 6,260,898 B1 | 7/2001 | Kano et al. | |
| 6,314,780 B1 | 11/2001 | Naka et al. | |
| 6,339,871 B1 | 1/2002 | Maesoba et al. | |
| 6,698,983 B1 | 3/2004 | Kiernan et al. | |
| 6,885,123 B2 | 4/2005 | Gorohata et al. | |
| 6,938,323 B2 * | 9/2005 | Katou et al. | 29/596 |
| 7,140,098 B2 | 11/2006 | Maeda et al. | |
| 7,210,215 B2 | 5/2007 | Kato et al. | |
| 7,293,350 B2 | 11/2007 | Sawada | |
| 7,302,750 B2 | 12/2007 | Niimi et al. | |
| 2001/0007169 A1 | 7/2001 | Takahashi et al. | |
| 2005/0166393 A1 * | 8/2005 | Sawada | 29/732 |

* cited by examiner

*Primary Examiner*—A. Dexter Tugbang  
*Assistant Examiner*—Livius R Cazan  
(74) *Attorney, Agent, or Firm*—Blakely Sokoloff Taylor & Zafman LLP

(57) ABSTRACT

Method and apparatus for forming motor winding conductors rectangular conductor wire. The method comprises populating with hairpin shaped conductors, most of a forming fixture having a plurality of pockets distributed in equal number in one or more pairs of adjacent circles, each concentric with a center of the forming fixture, at least one member defining each of the pockets in one of each pair of adjacent circles being rotatable, at least through a limited angle, with respect to a member defining the pockets in the other of the respective pair of adjacent circles, the hairpin conductors each having first and second legs integrally joined by a loop at one end thereof, with one leg of each hairpin conductor in a respective one of the pockets in a pair of adjacent circles, and rotating in a first direction, relative to each other, the members defining the pockets in each pair of circles through a predetermined angle, to permanently separate the two legs of each hairpin conductor without substantial rotation of each leg of the hairpin conductors relative to its respective pocket. Various additional features are disclosed.

14 Claims, 10 Drawing Sheets

SEZIONE A-A

METHOD FOR FORMING MOTOR WINDING CONDUCTORS

BACKGROUND OF THE INVENTION

1. Field of the Invention

The present invention relates to the field of electric motors.

2. Prior Art

Tecnomatic S.p.A., assignee of the present invention, has in the past made a limited number of motor motors and D.C. motor rotors using flat or square wire for the windings. In that regard, it is to be noted that as used herein, "flat" or "square" wire means wire having four substantially flat sides, each joined to adjacent sides, typically by a rounded edge. In the case of square wire, the wire may be formed in the square shape and then coated with typical winding insulation, or in some cases, pre-coated round wire has been rolled into the square shape. Rolling of round wire to a square shape has definite limits if the insulation is not to be damaged, though smaller rounded edges may be achieved if the wire is first formed by drawing or otherwise formed into the square shape and then coated. Even if the wire is first formed in the desired shape and then coated, some degree of rounding on the edges is desired for various reasons, including prevention of surface tension from pulling the coating away from the sharp edges during coating, preventing the sharp edges from cutting through the coating afterward, and preventing electric field concentration on the sharp edges to induce early breakdown. Thus, as used herein, the words "square", or "flat" or equivalent words used to describe the cross-section of an insulated copper wire are used in the general sense and are not to be construed as excluding significant or substantial rounded corners joining the substantially flat sides. "Flat" as used herein and in the claims means having two opposite sides having a greater separation than the other two opposite sides, its width being greater than its thickness. "Straight" as used herein and in the claims means substantially free of bends. Accordingly, either a flat or a square conductor may or may not be straight. "Rectangular" as used herein is a more general term meaning flat or square, square being a special case of rectangular wherein the dimension between two opposite sides is equal to the dimension between the other two opposite sides.

In the prior art motors, the wire has been cut to the desired length and stripped, then bent into a hairpin shape by hand on a one at a time basis, then the two legs of the hairpin separated one hairpin at a time and hand inserted into one end of a rotor or stator core, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However in the case of stators, to bring out the connections to the phases, and to interconnect phases, the corresponding wires needed to be re-bent to isolate them from the connections within each phase, something again previously done by hand.

The use of the flat or square wire for the windings produces very efficient and high power to weight ratio motors because of the greater cross-section of copper that can be put into a winding slot. However, the procedure described above is slow and highly labor intensive, and not suitable for a mass produced motor.

DETAILED DESCRIPTION OF THE PREFERRED EMBODIMENTS

In the description of preferred embodiments of the present invention to follow, the terms "flat", "square", "rectangular" and "straight" will be used. Unless otherwise apparent, such terms are used in accordance with the definitions thereof set forth in the prior art section above.

The purpose of the present invention is to automatically twist hairpin shaped conductors of rectangular wire as may be used, by way of example, as part of a process for automatically manufacturing motors of the type described above, to form rotor and stator conductors. An exemplary hairpin conductor may be seen in FIG. 1a and is characterized by an overall length $L_O$, formed by bending a rectangular insulated conductor with the ends thereof being stripped of insulation over the length $L_S$. The typical insulation on the hairpin conductors is a typical motor or solenoid winding insulation well known in the motor art. In a preferred embodiment of the invention, one side 20 of the hairpin conductor as formed is substantially flat up to the loop 22, with the upper portion 24 of the other side of the hairpin being bent initially to touch or almost touch the opposite leg of the hairpin, resulting in a slight outward bend in region 26, which together with spring back after bending, results in the lower ends of the hairpin shape being somewhat separated, but elastically deformable into contact with each other. In the preferred embodiment this is desired, as this separation, coupled with the elasticity of the bent conductor, is used in a subsequent process for forming motor rotors and stators. The rectangular wire in one stator embodiment has a cross-section having a width of 4.4 millimeters and a thickness of 3.0 millimeters measured over the insulation, and is used for the fabrication of a 65 kilowatt three-phase AC motor. Obviously these dimensions are representative of one motor only, as the dimensions will vary depending on the motor design and power. In the exemplary stator, the dimension $L_S$ for the particular hairpin conductor illustrated is approximately 18.1 cm, though as shall subsequently be seen, the exemplary stator uses hairpin conductors of two similar but slightly different overall lengths. The stripped length $L_S$ in the exemplary stator is approximately 7.5 millimeters across the width (larger dimension) of the hairpin conductors, though the stripped length across the thickness of the exemplary hairpin conductors is slightly less. During formation of the hairpin conductors, preferably the free ends thereof are tapered inward in both planes, as shown in FIGS. 1b and 1c.

Figure 2:
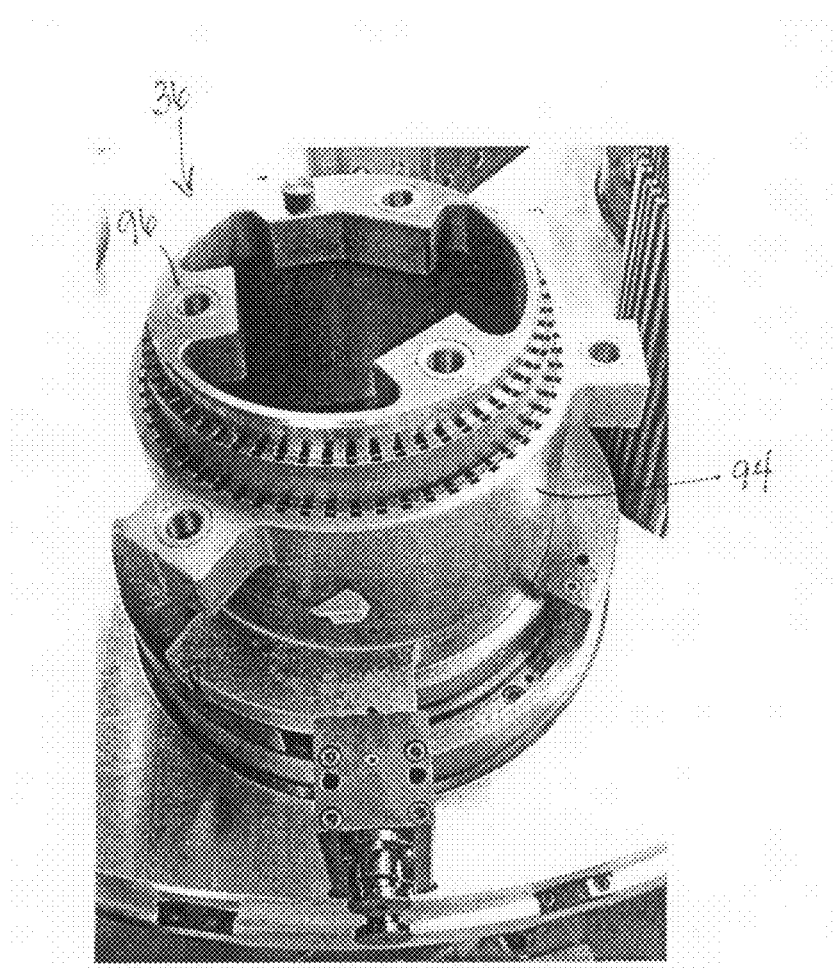
FIGS. 2 and 3 show an exemplary forming fixture into which the hairpin conductors are to be automatically inserted.
Figure 3:
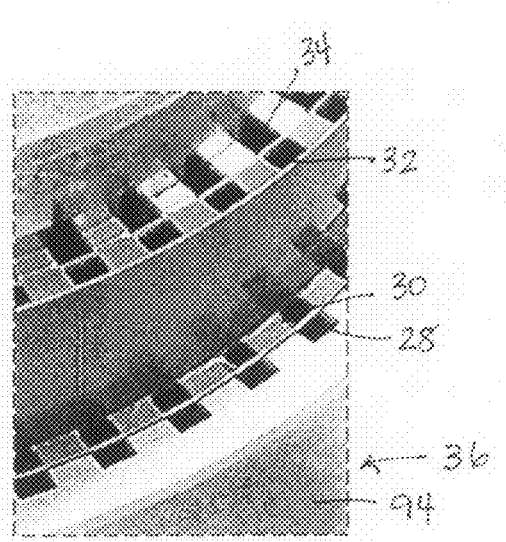

The exemplary fixture into which the hairpin conductors are to be automatically inserted may be seen in FIGS. 2 and 3. This exemplary fixture is configured for forming motor stator conductors for a 65 kilowatt three phase AC motor having four conductors per stator slot. It is to be understood, however, that fixtures of different sizes, etc. may be used for forming rectangular winding conductors for rotors or stators of various size motors having the same or different number of rectangular conductors per rotor or stator slot. In the case of the exemplary stator, there are sixty stator slots. Accordingly, in the fixture of FIGS. 2 and 3, sixty individual pockets 28, sixty individual pockets 30, sixty individual pockets 32 and sixty individual pockets 34 are provided, equally spaced around different diameter circumferences, though closely spaced radially, with pockets 28 and 30 as well as pockets 32 and 34 being radially aligned with each other, at least when the fixture is in the position shown. In the embodiment shown, there is a thin divider between each pair of pockets. It should be noted however, that the word pockets is used herein and in the claims in the general sense, and includes slots in the fixture parts that alone or in conjunction with the adjacent fixture part confine each of the hairpin conductor legs, both in relative rotation and translation when the fixture is energized. The different diameters on which the pockets are located are approximately the same as the diameters of the respective locations of the legs of the stator conductors in the stator in which the stator conductors will be used.

Figure 1A:
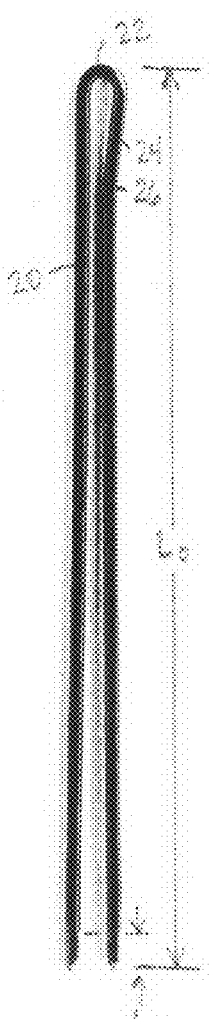
FIGS. 1a, 1b and 1c illustrate exemplary hairpin conductors used in the present invention method and apparatus.
Figure 1B:
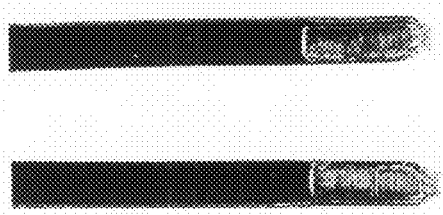
Figure 1C:
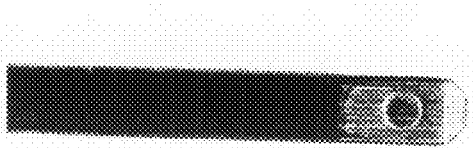

The hairpin conductors of the type shown in FIG. 1a are automatically placed into a respective pair of pockets 28 and 30 or 32 and 34, with the straight side 20 of the exemplary hairpin conductor of FIG. 1a facing radially inward in the fixture. The different diameters on which the pockets are located are approximately the same as the diameters of the respective locations of the legs of the stator conductors in the stator in which the stator conductors will be used. Also, while the legs of the hairpin conductors do not fit tightly in the pockets, but rather slide in easily, the pockets do restrict the rotation of the rectangular conductors relative to the respective pocket. Further, as shall subsequently be seen, because the stator slot openings at a smaller diameter are not as far between as the stator slot openings on the larger diameter, but the end turns at each end of the stator are the same, the hairpin conductors to be inserted into pockets 32 and 34 are intentionally made a predetermined amount shorter than the hairpin conductors to be inserted into the outer pockets 28 and 30. Further, as shall be subsequently described in greater detail, because the hairpin conductors are initially elastically deflected when inserted into the slots, the spring back of the hairpin conductors can hold the conductors at the elevation in the fixture at whatever elevation is set.

Figure 4:
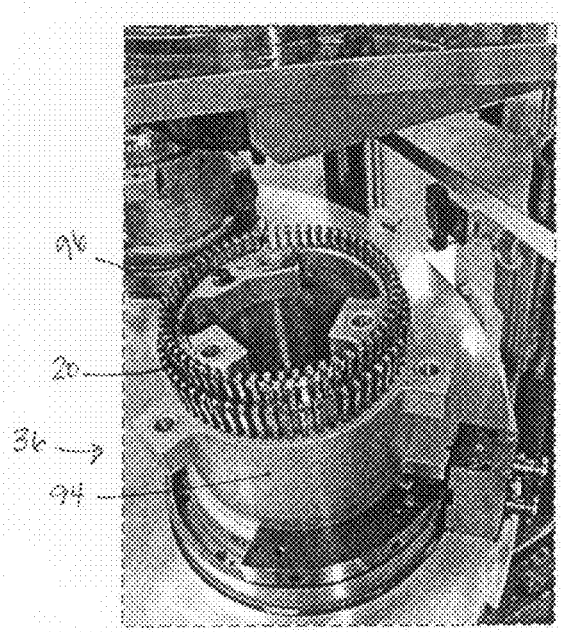
FIG. 4 illustrates the forming fixture having two rows of hairpin conductors with the inner diameter of hairpin conductors standing higher than the outer diameter thereof.

When substantially all of the pockets 28, 30, 32 and 34 of the fixture 36 are filled with hairpin conductors 20, the fixture will appear as shown in FIG. 4, with the inner diameter of hairpin conductors standing higher than the outer diameter thereof. Preferably the hairpin conductors in the outer diameter are slightly longer than those in the inner diameter and stand slightly higher relative to the adjacent surface of the forming fixture than the hairpin conductors in the inner diameter. This accounts for the diameter difference, so that once the conductors are formed, the part forming the end turns will extend the same distance from the motor stator or rotor, regardless of which diameter within the slots they are placed.

Figure 5:
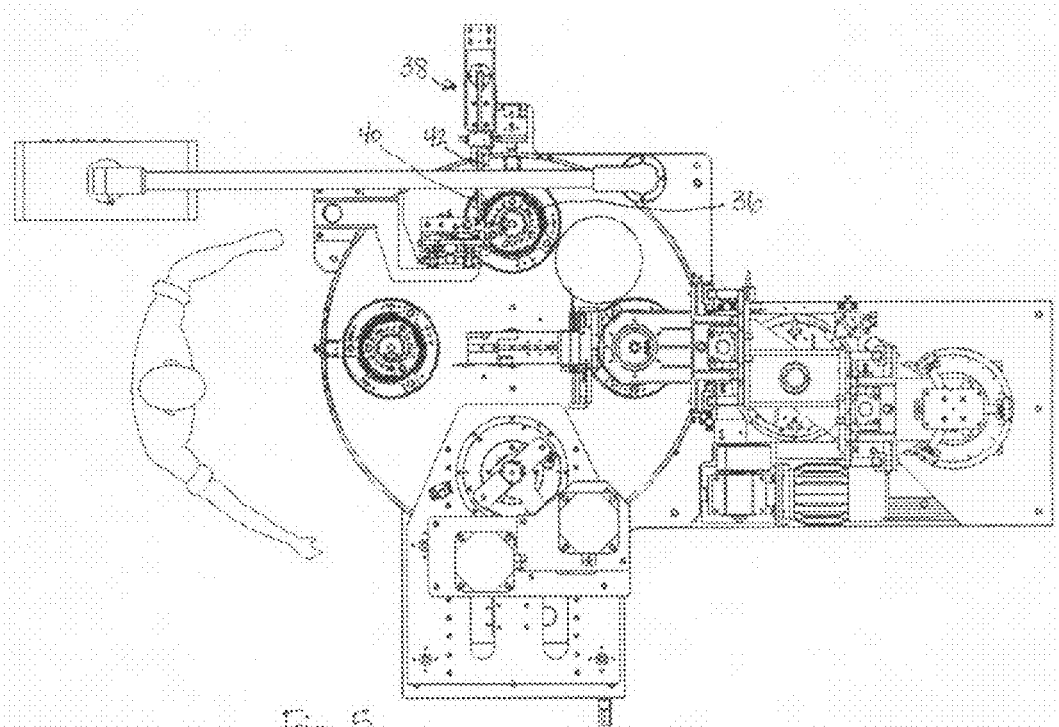
FIG. 5 shows an exemplary embodiment of an overall system in which the present invention is used.

Now referring to FIG. 5, an exemplary embodiment of an overall system in which the present invention is used may be seen. Of particular relevance to the present invention is the hairpin forming apparatus, generally indicated by the numeral 38, and fixture 36 positioned to receive the hairpin conductors from the hairpin 38. In that regard, it will be noted that the hairpin conductors 20 slide down a vertically oriented sheet metal guide 42, positioned as may be seen in FIG. 5 to deliver the hairpin conductor substantially tangentially to the circumference on which the pockets 28 through 34 reside. The hairpin conductors 20 ejected by the hairpin forming apparatus 38 slide under the influence of gravity along sheet metal member 42 to the hairpin insertion assembly, generally indicated by the numeral 44.

Figures 7A, 7B:
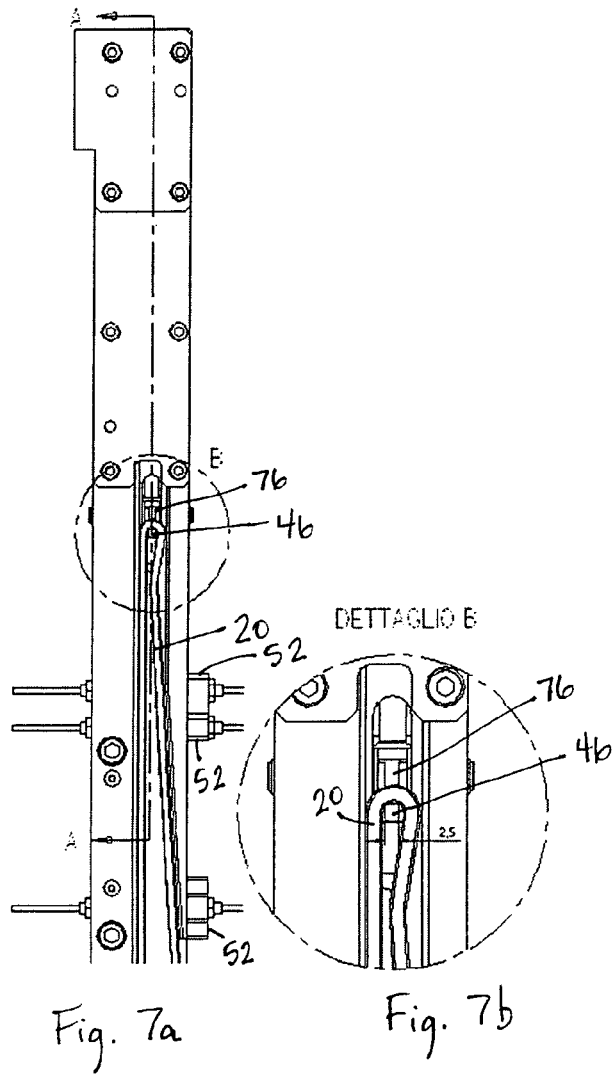
FIGS. 7a and 7b show a face view of part of the hairpin insertion assembly and a local portion thereof taken on an expanded scale.
Figure 8:
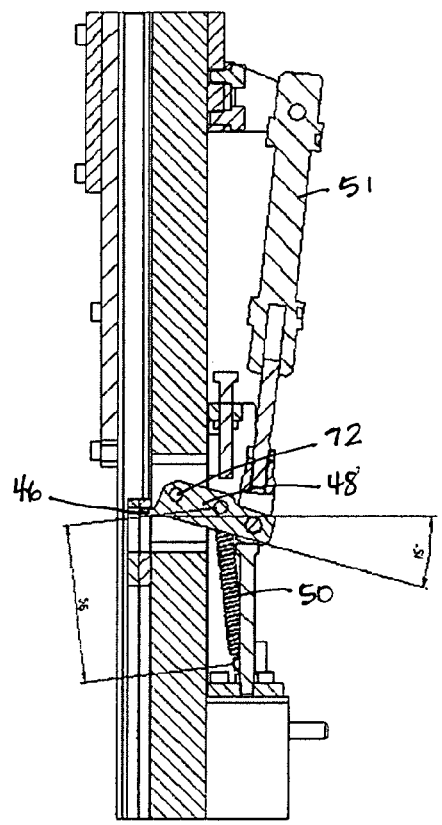
FIG. 8 is a side cutaway view of part of the hairpin insertion assembly.

A face view of part of the hairpin insertion assembly and a local portion thereof taken on an expanded scale may be seen in FIGS. 7a and 7b, with a side cutaway view of part thereof being shown in FIG. 8. The hairpin conductors 20 are delivered to the insertion assembly from the lower end of member 42 and initially are held there by a finger 46 on a pivoting member 48, normally held in the extended position by spring 50. The hairpin conductor 20 will freely hang vertically in this position, being sensed that it is in the proper vertical position by photo-optical detectors 52. Once in that position, pneumatic actuator 51 may be energized to swing finger 46 down and out of the way, generally allowing hairpin conductor 20 to fall within the confines of the opening in the face of the insertion assembly. In that regard, as may be noted in FIG. 9, when the hairpin conductor 20 is released, because of the spread in the legs thereof, the right-hand leg as shown in that Figure will be caught by stop 54, thereby preventing the hairpin conductor from falling out of the insertion assembly.

The fixture 36, (FIGS. 2 through 5) is mounted for accurate angular indexing in six degree increments (360° divided by sixty slots) between hairpin insertions. The first hairpin conductors 20 each are placed with a respective leg thereof in a respective one of pockets 28 and 30 until these pockets are substantially fully populated. The word "substantially" is added here, however, as in one embodiment three predetermined pair of pockets 28 and 30 of the outer pockets are automatically left empty because the corresponding positions in the final stator uses conductors with one lead having a substantially greater length to provide external connection to the various phases of the motor. In the preferred embodiment, fifty-seven pairs of pockets 28 and 30 automatically become populated with hairpin conductors, with all sixty of the pockets 32 and 34 of the inner diameter getting populated. One unpopulated pocket may be seen in FIG. 19.

Figure 6:
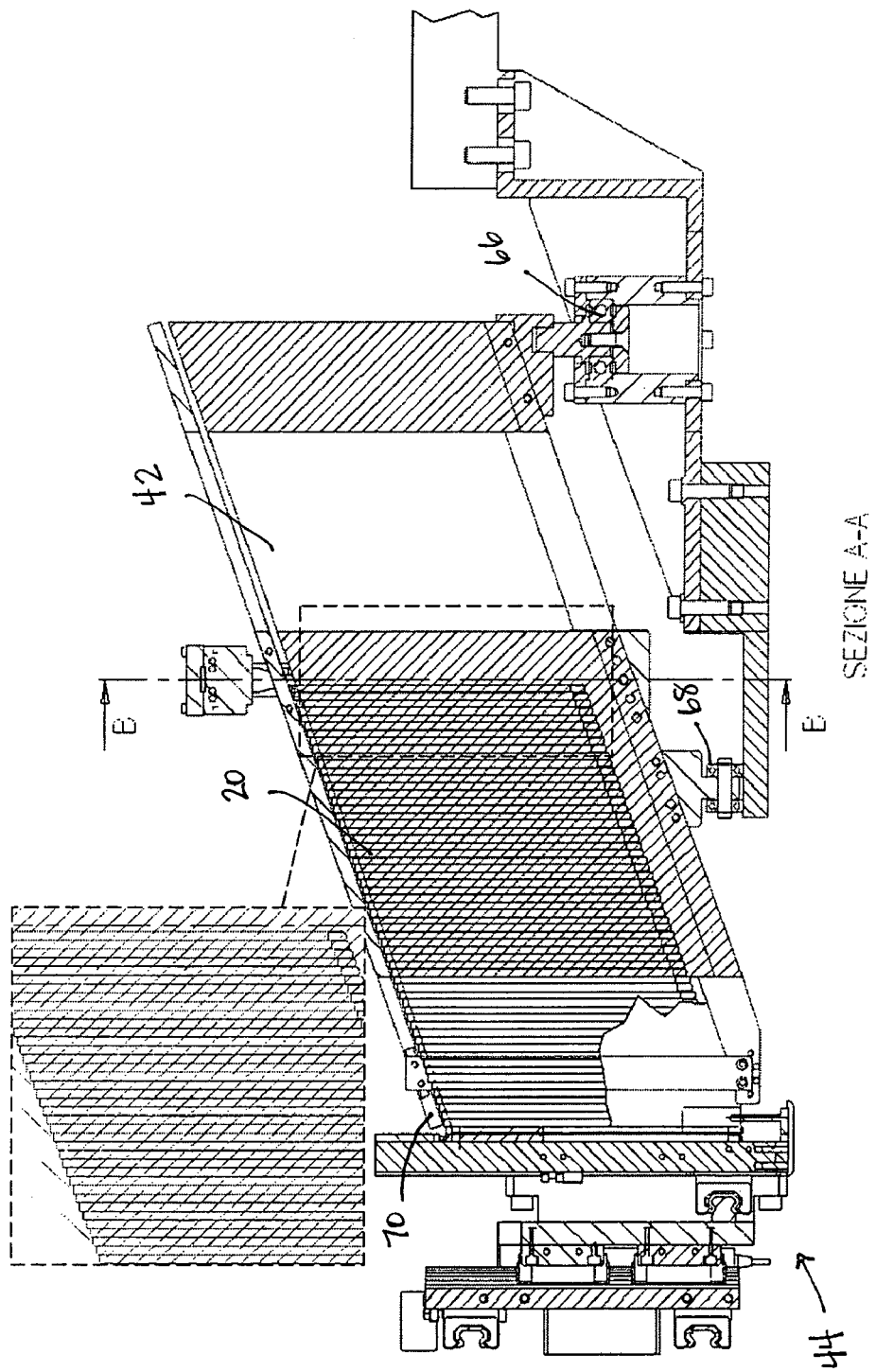
FIG. 6 illustrates the support of the insertion assembly in a preferred embodiment to feed the hairpin conductors to the insertion assembly when the insertion assembly is in either of the required two radial positions.
Figure 10:
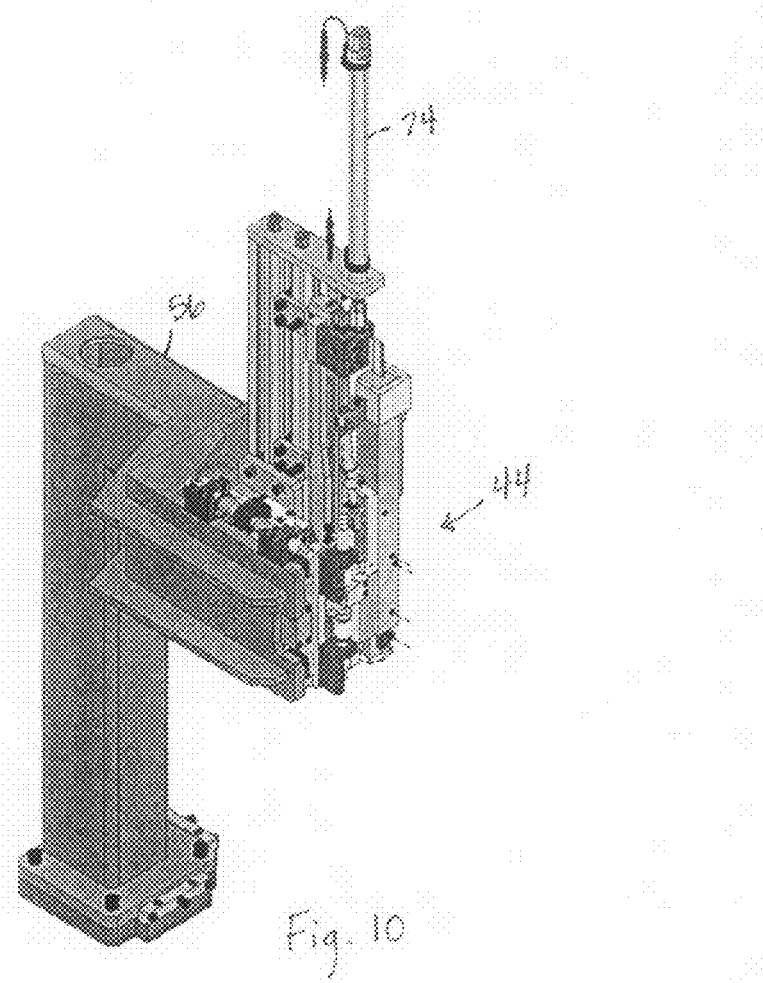
FIGS. 10, 11 and 12 show perspective views of the hairpin conductor insertion assembly and parts thereof.
Figure 11:
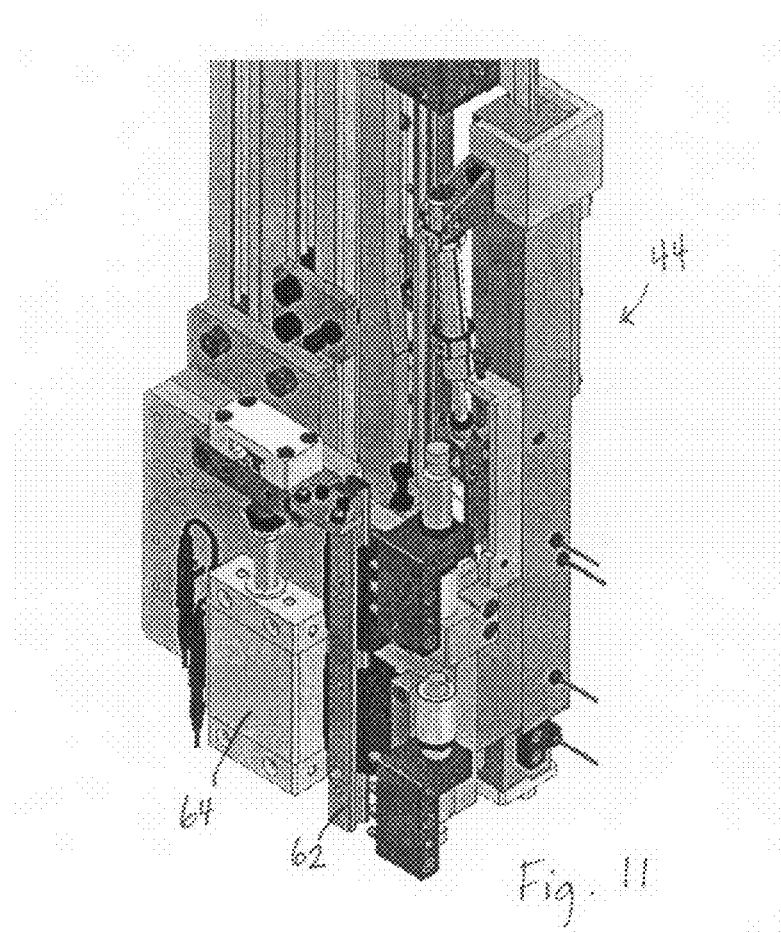
Figure 12:
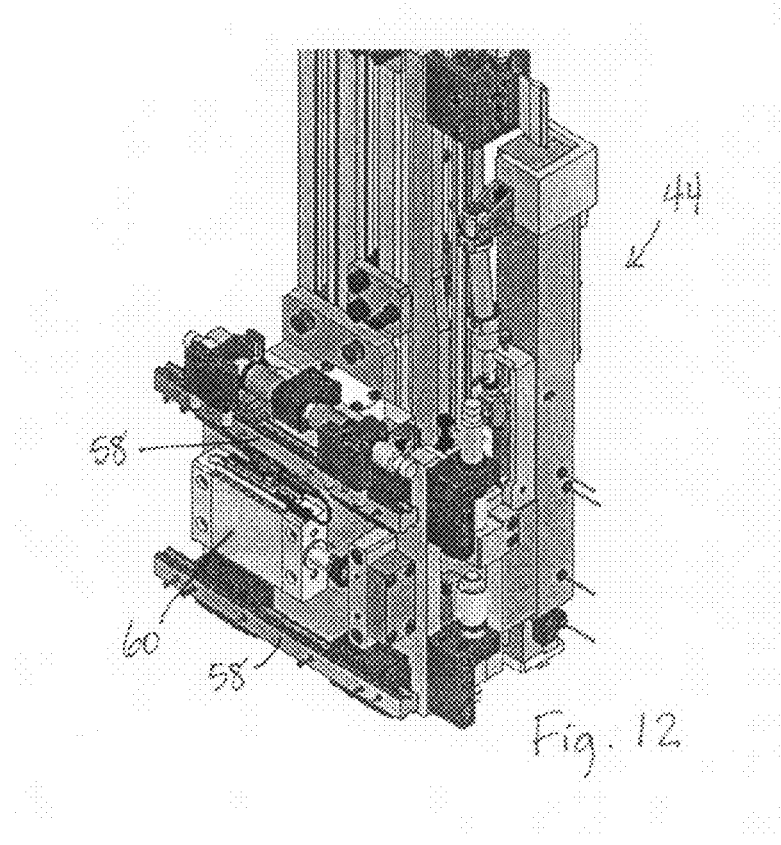

Now referring to FIGS. 10, 11 and 12, perspective views of the hairpin conductor insertion assembly 44 and parts thereof may be seen. FIG. 10 shows the entire assembly, which is mounted on a support 56 in a manner to provide horizontal and vertical motion of the insertion assembly. For horizontal motion, the assembly is mounted on rails 58 (FIG. 12) as controlled by actuator 60 and on vertical rails 62 (only one of which is visible in FIG. 11) for vertical motion as controlled by actuator 64. To properly feed the hairpin conductor to the insertion assembly 44 when the insertion assembly is in either of the required two radial positions in fixture 36, the feeder is coupled to the insertion assembly 44 and supported on a combination of a bearing 66 (FIG. 6), allowing the feeder assembly to pivot at the hairpin forming assembly 38 (FIG. 5), with the center of the feeder assembly being supported on bearings or wheels 68 to provide a second support allowing the desired motion. In addition, the final path of travel of the hairpin conductors 20 into the insertion assembly 44 is defined by a pivoted section seen in part as section 70 in FIG. 6, thereby accommodating the required vertical motion of the insertion assembly.

Figure 9:
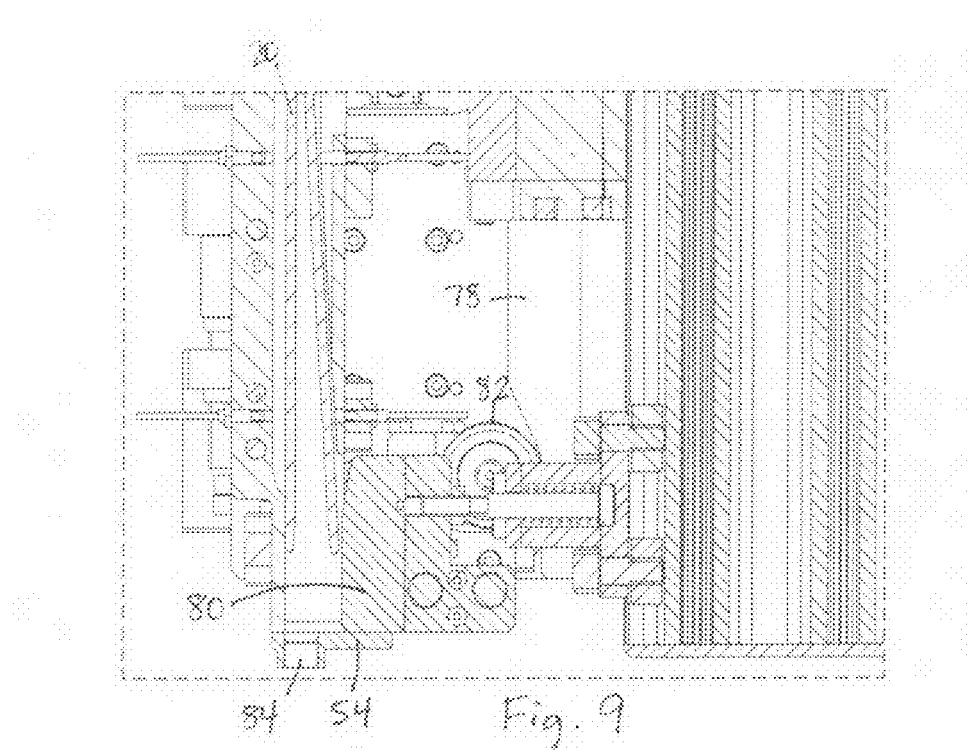
FIG. 9 illustrates a stop to prevent the hairpin conductor from falling out of the insertion assembly when the hairpin conductor is released.
Figures 13, 14:
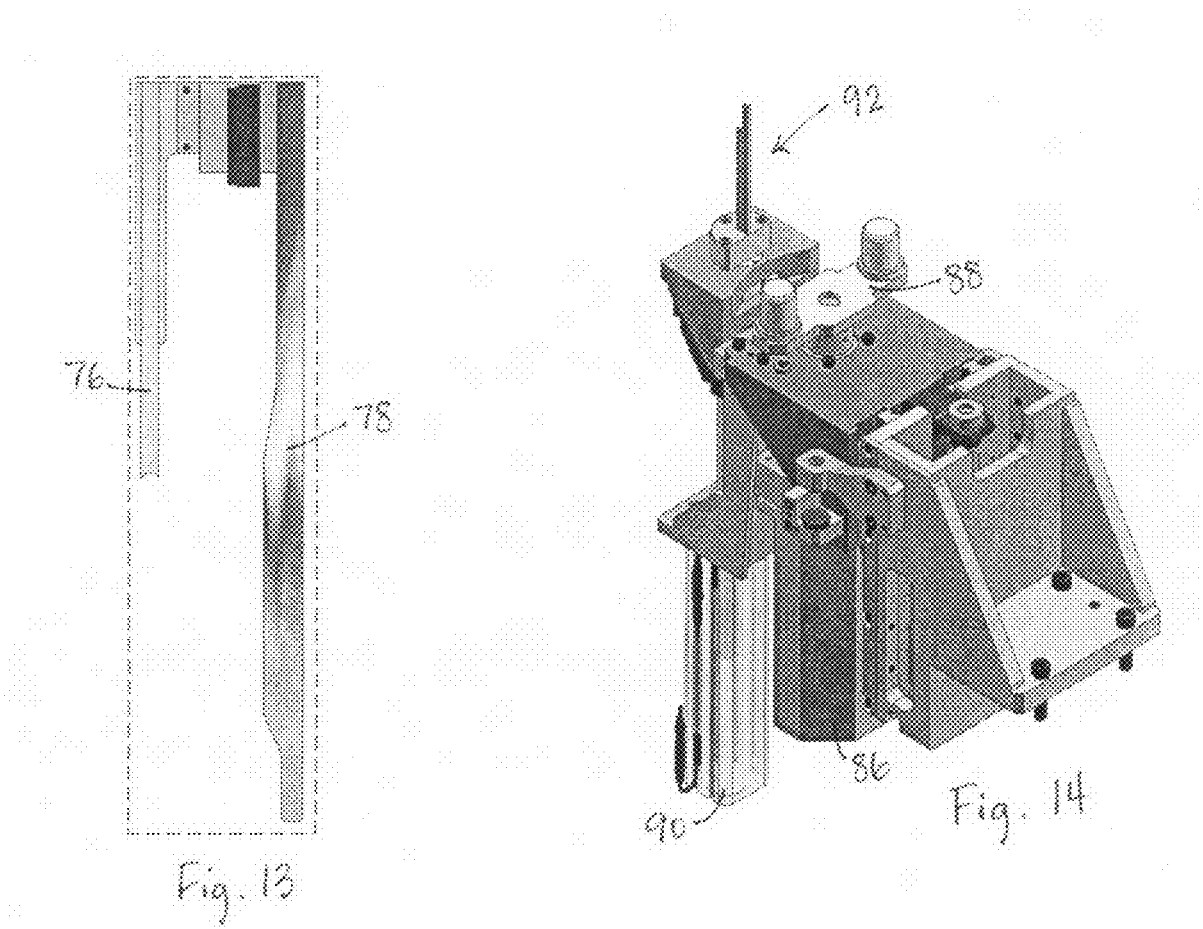
FIG. 13 shows the push bar and the cam bar used in the insertion assembly of a preferred embodiment.
FIG. 14 shows more details of the drive for the forming fixture.

To actually insert a hairpin conductor once the fixture 36 is properly position and a hairpin conductor is sensed as being in the proper position, actuator 51 (FIG. 8) is actuated, causing member 48 to rotate about axis 72, swinging finger 46 down and away from the support of the hairpin 20. Also, actuator 74 (FIG. 10) is actuated, which has two primary functions. First, it moves push bar 76, visible in FIGS. 6 and 7, though best illustrated in FIG. 13, downward and at the same time and as part of the same motion, moves cam bar 78 downward. The function of the cam bar 78, also shown in FIG. 13, is best illustrated in FIG. 9, namely, to force assembly 80 as a result of the force of cam bar 78 on cam follower 82 to sufficiently close the legs of the hairpin conductor so that the same will fit through opening 84 as pushed there through and into an associated pair of a pocket in the fixture 36 (FIGS. 2 and 3). Thus by sequentially inserting hairpin conductors into the fixtures 36, the fixture may be populated as required for the particular motor or stator, except for a very limited number of hairpin conductors of extraordinary length for phase connections in a stator assembly. In that regard, it should be noted that the feeding of each hairpin conductor into the fixture may be assisted in part by the ends thereof shaped as shown in FIGS. 1b and 1c.

Now referring to FIG. 14, more details of the drive for the fixture 36 (FIGS. 2 and 3) may be seen. In the preferred embodiment, the indexing of the fixture is done through gear servomotor 86, driving coupler 88 coupled from underneath to the fixture. Also in a preferred embodiment a pneumatic actuator 90 drives pins generally indicated by the numeral 92 (see also FIG. 15) from below the fixture to assure that each hairpin conductor is at the proper elevation once inserted into the fixture. This may or may not be necessary, as the insertion operation itself may assure the proper and repeatable elevation. In that regard, note from FIGS. 2 and 3 that on the fixture the pockets 32 and 34 are elevated with respect to pockets 28 and 30. This is to provide clearance over the hairpin conductors inserted into the outer pockets 28 and 30 while inserting hairpin conductors into pockets 32 and 34. In the preferred embodiment, the fixture is sufficiently deep to hold the hairpin conductors at the proper elevation for the twisting operation without having the ends of the hairpin conductor legs extending out of the bottom of the fixture.

Figures 15, 16:
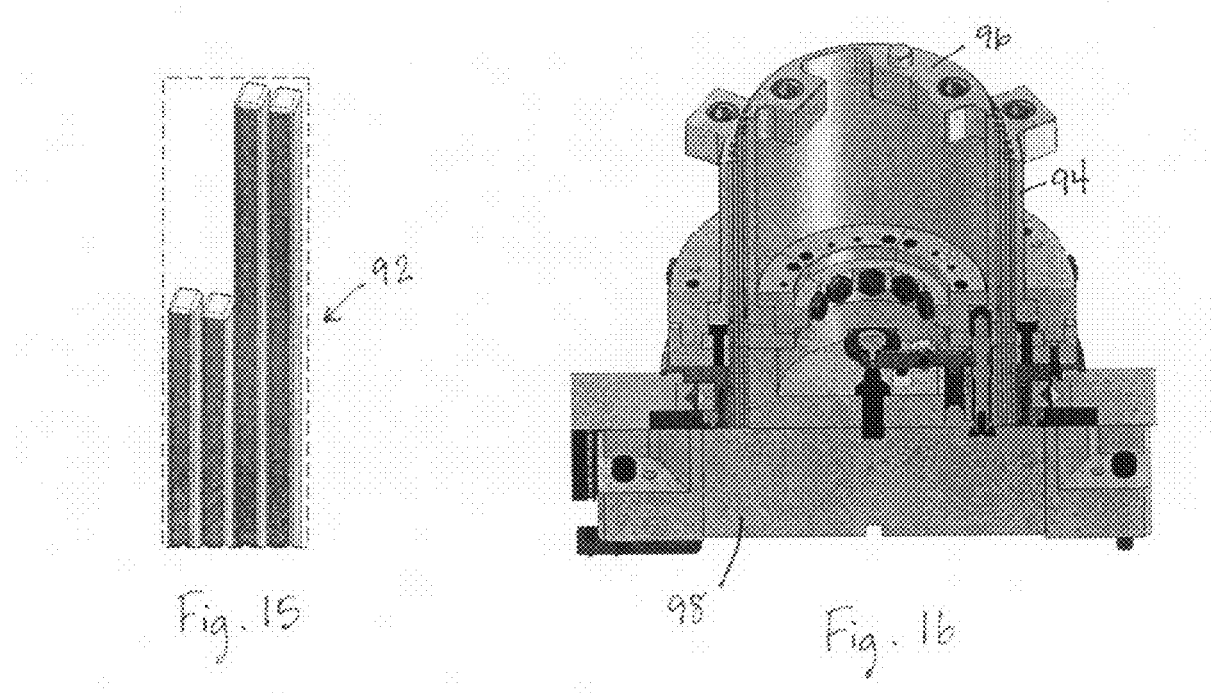
FIG. 15 shows a pneumatic actuator to drive pins from below the forming fixture to assure that each hairpin conductor is at the proper elevation once inserted into the fixture.
FIG. 16 is a cross-section of a forming fixture of a preferred embodiment.
Figure 17:
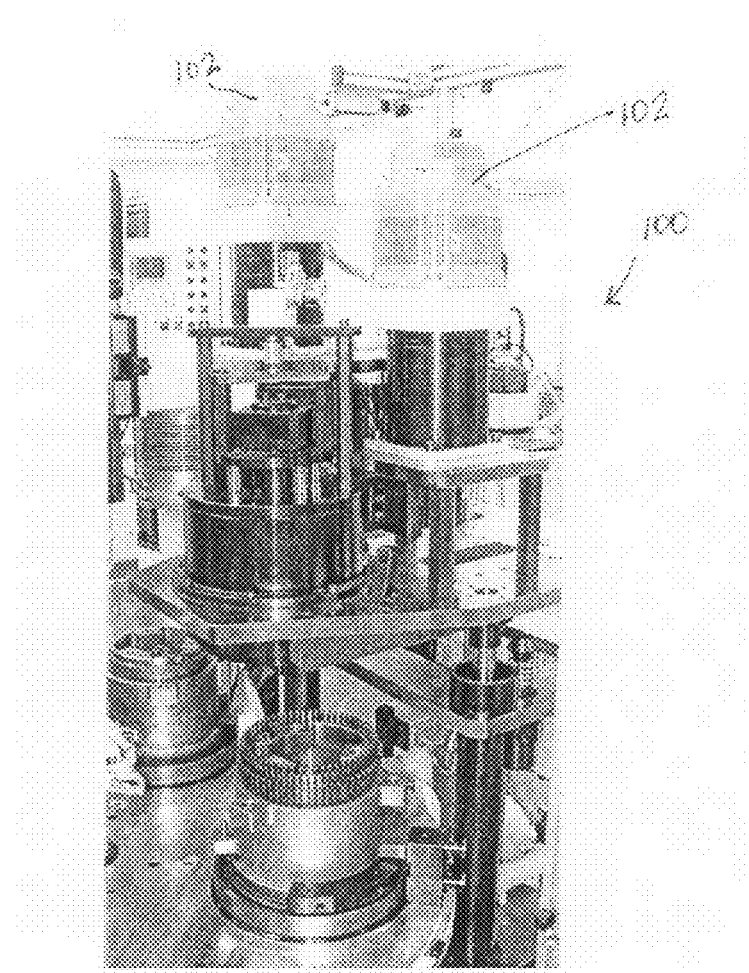
FIG. 17 shows the drive system for the forming fixture.
Figure 18:
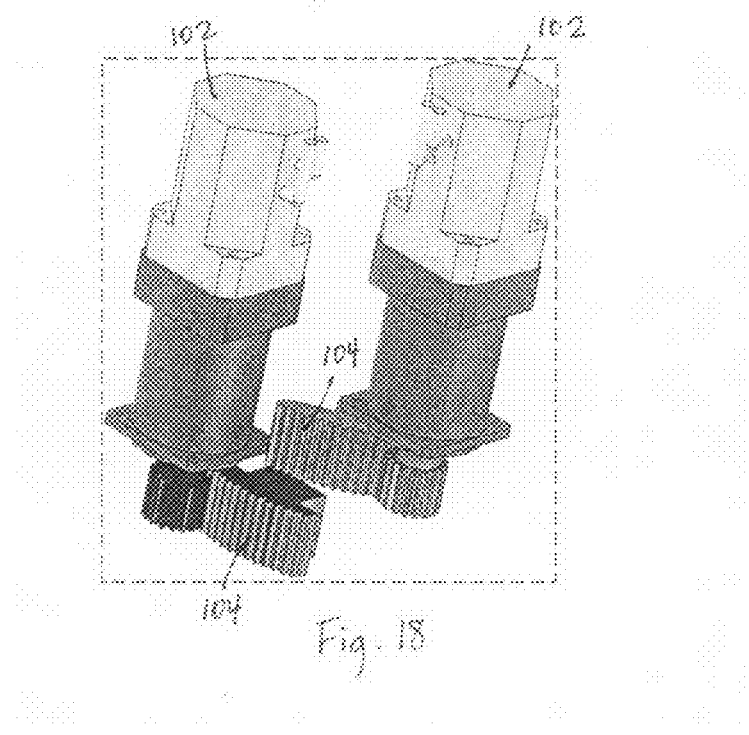
FIG. 18 shows two servo gear motors which controllably drive gear sectors in opposite directions to power the forming fixture.
Figure 19:
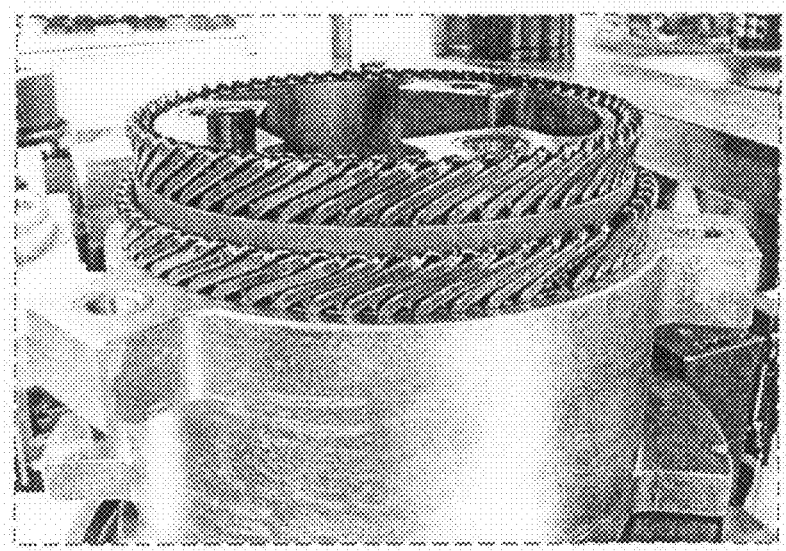
FIG. 19 illustrates a populated forming fixture after twisting.
Figure 20:
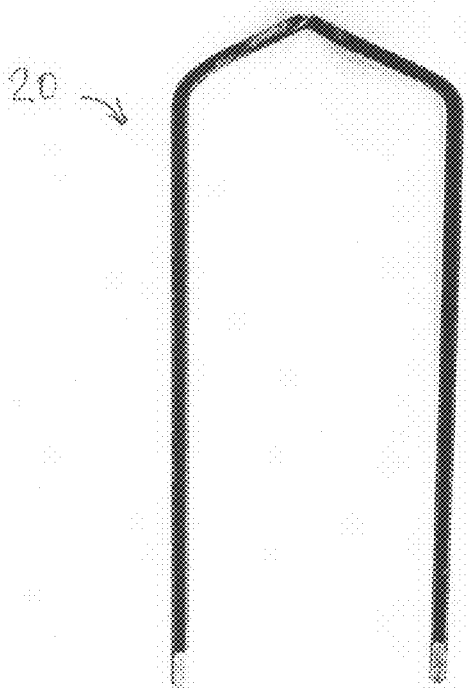
FIG. 20 shows an individual winding conductor as formed as shown in FIG. 19.

FIG. 16 is a cross-section of the fixture 36 of a preferred embodiment of FIGS. 2, 3 and 4. Of particular importance to this embodiment is the fact that the outer member 94 containing pockets 28 (FIGS. 2, 3, 4 and 16) is mounted for rotation, as is inner member 96 containing pockets 34. The region between these two, however, containing pockets 30 and 32 (FIG. 3) is rigidly attached to the base 98 (FIG. 16). The equally spaced three holes in the inner member 96 and the three equally spaced holes in the outer member 94 (FIGS. 2 and 4) are to receive a drive system from above, supported to be lowered so as to engage these holes with drive pins without contact with the hairpin conductors. The drive system, generally indicated by the numeral 100 (FIG. 17), includes two servo gear motors 102 which controllably drive gear sectors 104 (FIG. 18) in opposite directions. The net result of this motion is that pockets 28 (FIG. 3) move clockwise with respect to pockets 30, and pockets 34 move counterclockwise with respect to pockets 32. This is equivalent to moving both pockets 30 and 34 counterclockwise with respect to pockets 28 and 32, but transmits less torque to the base 98 (FIG. 16). In that regard, obviously different types of drive systems could be used, with either one of each pair of pockets being driven, or as a further alternative, retaining the member containing either pockets 34 or 28, rotating the other set of pockets through twice the desired angle, with the intermediate pockets 30 and 32 having a limitation on their rotation equal to half the total drive. In any event, the net result of the twisting is shown in FIG. 19, twisting each winding conductor as shown in FIG. 20. Each of the hairpin conductors 20 is now formed with the legs separated and joined at one end thereof by part of the insulated conductor which part will become part of the end turns of the finished motor stator or rotor. The open loop of the hairpin conductors before twisting helps avoid an excessive concentration of bending of the insulated conductor at one location, thereby somewhat distributing the bending and avoiding damage to the insulation layer. After forming the hairpin conductors as described, the rotatable parts of the fixture are controllably rotated a small amount in the opposite direction to relieve the spring-back of the formed conductors. In a preferred stator or rotor fabrication process incorporating the present invention, the fixtures are advanced to the next station in the system of FIG. 5 for removal and placement in a rotor or stator, after which the fixture is rotated back to its initial state of FIGS. 2 and 3.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of forming motor winding conductors from rectangular conductor wire comprising:
    providing a forming fixture having a plurality of pockets distributed in equal number in one or more pairs of adjacent circles, each concentric with a center of the forming fixture, at least one member defining each of the pockets in one of each pair of adjacent circles being rotatable, at least through a limited angle, with respect to a member defining the pockets in the other of the respective pair of adjacent circles, the members defining each of the pockets in each pair of first adjacent circles being at a first elevation, and the members defining each of the pockets in each pair of second adjacent circles adjacent to the first adjacent circles being at a second elevation higher than the first elevation, the difference in elevation providing clearance over the hairpin conductors inserted into the members at the first elevation when inserting hairpin conductors into the members at the second elevation;
    with the pockets of each respective pair of adjacent circles being aligned with a respective radial line from the center, populating at least most of the pockets with hairpin shaped conductors, each having first and second legs integrally joined by a loop at one end thereof, with one leg of each hairpin conductor in a respective one of the pockets in a pair of adjacent circles and aligned with a respective radial line;

spacing the loops of hairpin conductors in pockets for each pair of adjacent circles at a predetermined separation from the forming fixture for that pair of adjacent circles, either on populating the pockets or after populating the pockets; and, rotating in a first direction, relative to each other, the members defining the pockets in each pair of circles through a predetermined angle, to permanently separate the two legs of each hairpin conductor without substantial rotation of each leg of the hairpin conductors relative to its respective pocket;

wherein longer hairpin conductors are inserted in pockets for each pair of larger adjacent circles than in smaller adjacent circles, and the separation of the loops from the forming fixture, of hairpin conductors in pockets for each pair of larger adjacent circles, is greater than in smaller adjacent circles.

2. The method of claim 1 wherein the adjacent circles have a respective diameter approximately equal to the diameter of the eventual location of a respective leg of a hairpin conductor in a slot of a motor in which the winding conductor will be used.

3. The method of claim 1 wherein one member defining each of the pockets in one of each pair of adjacent circles is rotatable and the other member is fixed.

4. The method of claim 1 further comprising, after rotating in the first direction, relative to each other, the members defining the pockets in each pair of circles are rotated in a second direction opposite the first direction through a second predetermined angle, the second predetermined angle being selected to relieve spring-back in the winding conductors.

5. The method of claim 4 wherein the first predetermined angle less the second predetermined angle is equal to the angular separation between a predetermined number of slots in a motor in which the winding conductors will be used.

6. The method of claim 1 wherein the loops of hairpin conductors in pockets for each pair of adjacent circles are spaced at a predetermined separation from the forming fixture for that pair of adjacent circles when populating the pockets.

7. The method of claim 1 wherein the loops of hairpin conductors in pockets for each pair of adjacent circles are spaced at a predetermined separation from the forming fixture for that pair of adjacent circles after populating the pockets.

8. A method of forming motor winding conductors from rectangular conductor wire comprising:

populating, with hairpin shaped conductors, most of a forming fixture having a plurality of pockets distributed in equal number in multiple pairs of adjacent circles, each concentric with a center of the forming fixture, at least one member defining each of the pockets in one of each pair of adjacent circles being rotatable, at least through a limited angle, with respect to a member defining the pockets in the other of the respective pair of adjacent circles, the hairpin conductors each having first and second legs integrally joined by a loop at one end thereof, the forming fixture being populated with one leg of each hairpin conductor in a respective one of the pockets in a pair of adjacent circles, the members defining each of the pockets in each air of first adjacent circles heir at a first elevation and the members defining each of the pockets in each pair of second adjacent circles adjacent to the first adjacent circles being at a second elevation higher than the first elevation, the difference in elevation providing clearance over the hairpin conductors inserted into the members at the first elevation when inserting the hairpin conductors into the members at the second elevation; and, rotating in a first direction, relative to each other, the members defining the pockets in each pair of circles through a predetermined angle, to permanently separate the two legs of each hairpin conductor without substantial rotation of each leg of the hairpin conductors relative to its respective pocket;

wherein longer hairpin conductors are inserted in pockets for each pair of larger adjacent circles than in smaller adjacent circles, and the separation of the loops from the forming fixture, of hairpin conductors in pockets for each pair of larger adjacent circles, is greater than in smaller adjacent circles.

9. The method of claim 8 wherein the adjacent circles have a respective diameter approximately equal to the diameter of the eventual location of a respective leg of a hairpin conductor in a slot of a motor in which the winding conductor will be used.

10. The method of claim 8 wherein one member defining each of the pockets in one of each pair of adjacent circles is rotatable and the other member is fixed.

11. The method of claim 8 further comprising, after rotating in the first direction, relative to each other, the members defining the pockets in each pair of circles are rotated in a second direction opposite the first direction through a second predetermined angle, the second predetermined angle being selected to relieve spring-back in the winding conductors.

12. The method of claim 11 wherein the first predetermined angle less the second predetermined angle is equal to the angular separation between a predetermined number of slots in a motor in which the winding conductors will be used.

13. The method of claim 8 wherein the loops of hairpin conductors in pockets for each pair of adjacent circles are spaced at a predetermined separation from the forming fixture for that pair of adjacent circles when populating the pockets.

14. The method of claim 8 wherein the loops of hairpin conductors in pockets for each pair of adjacent circles are spaced at a predetermined separation from the forming fixture for that pair of adjacent circles after populating the pockets.

* * * * *